United States Patent Office 2,741,223
Patented Apr. 10, 1956

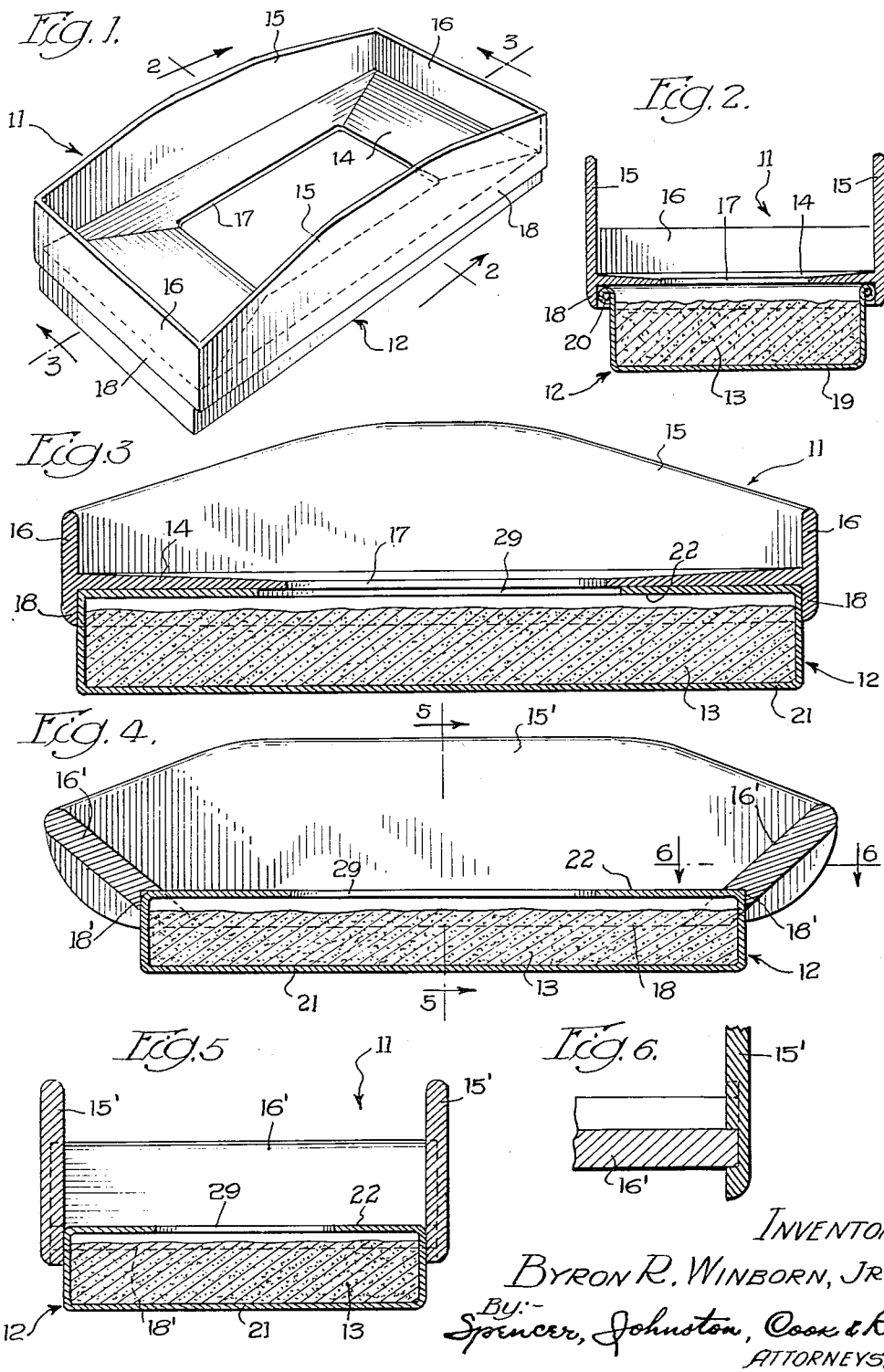

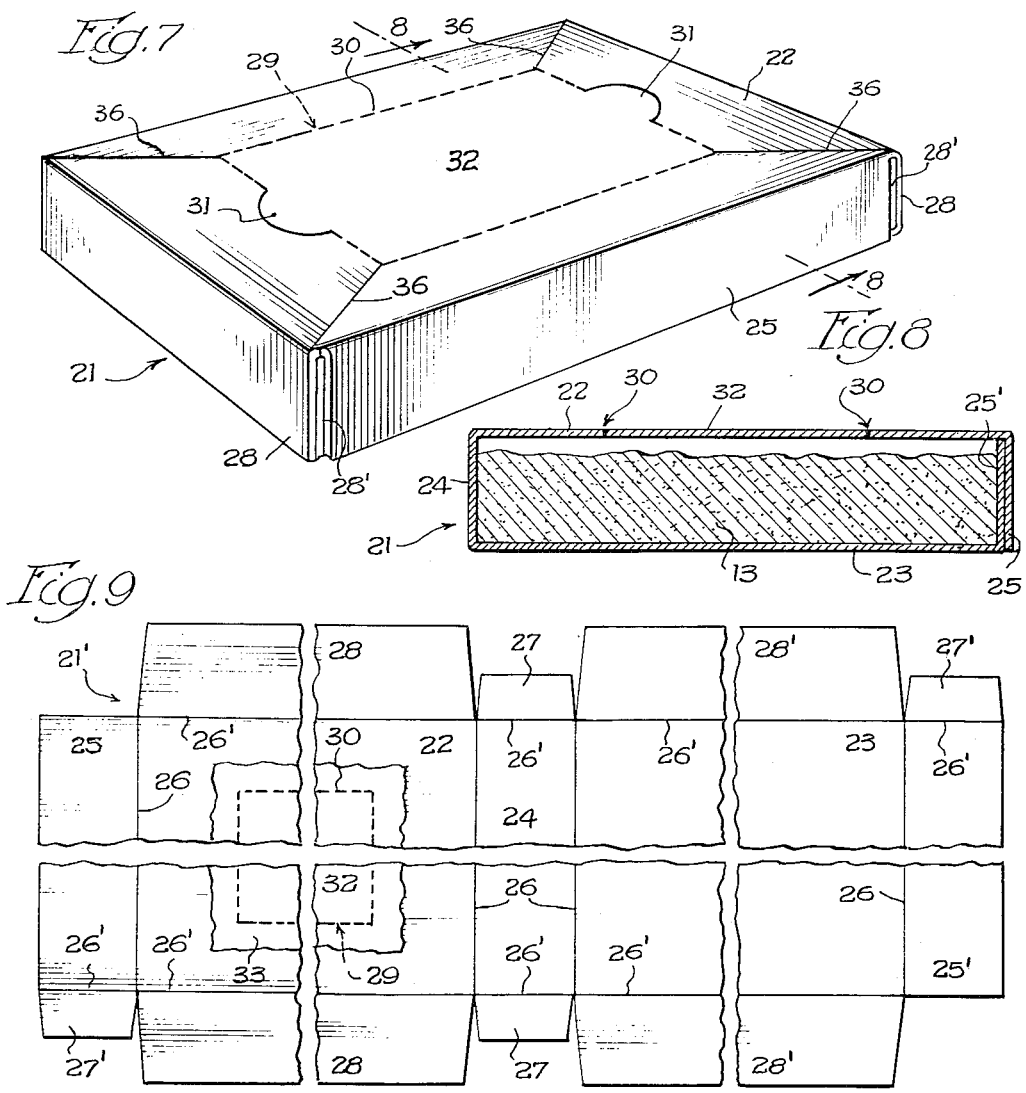

2,741,223

ANIMAL COMMODE

Byron R. Winborn, Jr., Elmhurst, Ill.

Application August 18, 1952, Serial No. 305,051

17 Claims. (Cl. 119—1)

The present invention relates in general to sanitation and has more particular reference to an improved toilet or commode for use by animals, such as dogs, cats, and other household pets.

Animal pets are commonly maintained in houses, apartments, hotels and other buildings, in which the lack of toilet facilities for animals makes it difficult, especially in congested areas, to provide adequately for the sanitary disposal of the solid and liquid excreta of animal pets.

An important object of the invention, therefore, is to provide an inexpensive and sanitary commode for house pets; a further object being to proivde a device of the character mentioned which an animal may be easily trained to use, the device including an excreta receiver, and an associated bowl or tray member adapted to form, with the receiver, a commode or latrine readily usable as such by an animal, the tray device being formed to receive the animal during defecation and urination, and to direct the resulting excreta into the disposable receiver unit.

Another object is to form the tray to facilitate periodic cleaning thereof, and to form the receiver in fashion facilitating the disposal of animal excreta delivered therein; a further object being to employ absorbent material in the receiver to maintain sanitary conditions therein at all times.

Another important object is to provide a disposable receiver comprising a carton containing highly absorptive earthy material, such as diatomaceous earth, or other preferably granular absorptive material; a further object being to form the carton as a relatively shallow, preferably rectangular container having an upwardly facing side provided with an opening of appreciable size giving access for the pawing of the absorptive material by an animal as a preliminary to excretion; a still further object being to provide an open bottom tray or bowl for removable attachment on the receiver, in open communication therewith.

Another important object resides in forming the container comprising the disposable unit of material, such as waxed card or carton board, which is substantially impervious to moisture; a further object being to form the top wall of the container with an opening fitted with a closure member that is adapted to be removed as by tearing, or otherwise, immediately prior to placing the disposable unit in service; a further object being to form said closure member as an integral, readily removable, part of the container.

Another important object is to form the top wall of the container with an opening for the purposes mentioned, which opening is normally closed by a relatively thin sheet of readily tearable material, such as paper, cellophane, or similar material, adapted to be torn away to uncover the opening and reveal the absorbent contents of the container through the opening.

Another important object is to package the disposable unit for sale over the counter, or for delivery by mail, or otherwise, in an enclosing, snugly fitting envelope of suitable sheet material, such as heavy wrapping paper, from which the disposable unit may be extracted for service in the manner intended, and into which the unit may be returned and sealed to facilitate the sanitary disposition of the used unit in sealed condition within its enclosing envelope.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings,

Figure 1 is a perspective view illustrating an animal commode embodying the present invention, the same comprising a tray 11 and a receiver 12 upon which the tray may be detachably mounted;

Figure 2 is a somewhat enlarged sectional view taken substantially along the line 2—2 in Figure 1 illustrating the tray 11 in mounted position upon a receiver 12;

Figure 3 is a somewhat enlarged sectional view taken substantially along the line 3—3 in Figure 1 showing the tray 11 mounted on a readily disposable receiver 12 of modified construction;

Figure 4 is a sectional view similar to Figure 3 and illustrating a tray 11 of simplified construction particularly well adapted for use in connection with a readily disposable receiver 12 of the sort shown in Figure 3, the device shown in Fig. 4 being drawn to a slightly smaller scale than that employed in presenting the modification illustrated in Fig. 3.

Figures 5 and 6 are sectional views taken substantially along the lines 5—5 and 6—6 in Figure 4;

Figure 7 is a perspective view of a readily disposable receiver of the sort shown in Figures 3 and 4 and comprising a carton forming a container of absorptive preferably granular material 13;

Figure 8 is a sectional view taken susbtantially along the line 8—8 in Figure 7;

Figure 9 is a plan view showing a blank from which may be constructed the container or carton forming the receiver shown in Figure 7;

Figure 10 is a perspective view illustrating the readily disposable receiver shown in Figure 7 and a sealable envelope for containing the same, the receiver and envelope in Fig. 10 being drawn to reduced scale as compared with the receiver shown in Fig. 7.

To illustrate the invention, the drawings show an animal latrine or commode comprising a bowl or tray 11 and a receiver 12 upon which the tray may be firmly mounted and attached in readily removable fashion, the receiver 12 comprising a relatively shallow container of susbtantial length and width and charged with highly absorptive preferably loose granular material 13.

The tray and receiver are preferably of rectangular configuration. As shown in Figures 1, 2 and 3, the tray may conveniently comprise a rectangular floor portion 14 having upstanding marginal walls, including spaced side walls 15 and end walls 16 secured to the floor portion at the edges thereof. The tray 11 may conveniently comprise an integral molded plastic element in which the side and end walls 15 and 16 are integrally interconnected with each other and with the floor portion 14, although the invention is, of course, not necessarily limited to the formation of the side and end walls and the bottom portion as an integral molded plastic element. On the contrary, the tray may be constructed of wood, sheet metal or other suitable material and the side wall and floor parts may be secured together in any suitable, convenient or preferred fashion, as by means of nails, screws, cement, or by soldering or welding.

The floor portion 14 is formed with a preferably rectangular opening 17 of substantial size and disposed medially of the tray to provide for the reception of the feet of an animal, outwardly of said opening; and the upper surfaces of the floor portion outwardly of the opening preferably slope downwardly and inwardly toward the opening and away from the side and end walls of the tray. The spaced side walls 15 also, between the opposite ends thereof, preferably extend at an elevation above the floor portion substantially greater than the elevation of the end walls 16. The end walls 16 thus are relatively lower than the side walls to facilitate the entry of an animal into the tray, between the side wall, across one or other of the end walls, the relatively higher side walls thus aiding in guiding the animal into the tray and in urging the animal to assume a desirably centered position therein.

The tray may also include dependent flange portions 18 outwardly of the opening 17, which portions may conveniently comprise integral downward extensions of the side and end walls 15 and 16 forming a downwardly extending marginal rib on the tray sized to snugly receive, within the rib, the upper marginal edge of the receiver 12.

The receiver 12 preferably comprises a relatively shallow container sized and configured to snugly interfit within the dependent rib or bead 18 of the tray, whereby the tray may be applied upon and interfittingly connected with the top of the container to form the commode of the present invention. As shown in Figure 2, the container 12 may conveniently comprise a conventional shallow open top pan 19, as of formed sheet metal, and having a curled or otherwise finished marginal rim 20 adapted for preferably tight frictional interfitment within the dependent rib 18 of the tray. In order to set up the equipment for use, the pan 19 may be charged substantially full of any suitable, preferably granular, absorbent material, such as diatomaceous earth, or other preferred absorbent material. The tray or bowl 11 may then be applied as a readily removable cover upon the upper open end of the pan in order to assemble the equipment in condition for use as a latrine by dog, cat, or other small house pet animal.

A house pet animal may be quickly and easily trained to use the device of the present invention, since the absorbent, preferably granular, earthy material 13 is exposed to view through the relatively large opening 17 in the floor portion 14 of the tray. Pet animals normally exhibit a desire to paw the earth as a prerequisite to evacuation of excreta. As a consequence, the exposure of the granular preferably earthy material 13 through the opening 17 utilizes the natural earth pawing urge of the animal to induce it to enter the tray and then to deposit its excreta through the opening 17 onto the material 13 exposed therethrough. The material 13 is highly absorbent and, consequently, will accommodate relatively large amounts of solid and liquid excreta before becoming fouled to an extent requiring replacement of the absorbent contents of the pan 19.

As shown more particularly in Figures 3–10, the receiver 12 may be, and preferably is, provided in the form of a disposable carton 21, preferably made of moistureproof material such as waxed card or paper board, and containing a supply of absorbent material 13. The carton and its contents are adapted for production as an article of manufacture ready for delivery to the ultimate user through normal channels of mercantile distribution.

To this end, the carton 21 may be constructed from a blank 21' of the sort shown in Figure 9 and comprising interconnected blank sections including top and bottom wall sections 22 and 23, an edge wall section 24, and edge wall flaps 25 and 25' integrally united at the adjoining side edges of said sections along bend lines 26. The blank may also comprise end closure flaps integrally connected at and along the opposite end edges of the wall sections 22, 23, 24, 25 and 25', as on bend lines 26', said end closure flaps including inwardly foldable tabs 27 at the opposite ends of the edge wall section 24, similar tabs 27' at an end of each of the edge wall flaps 25 and 25', and edge wall flaps 28 and 28' respectively at the opposite end edges of the top and bottom wall sections 22 and 23.

The sections of such a blank 21' may be folded along the bend lines 26 to bring the top and bottom wall sections 22 and 23 into spaced apart parallel relationship, and the edge wall flaps 25 and 25' may then be bent and sealed or otherwise secured, in overlapping relation, by any suitable or convenient fastening expedient. Thereupon, the tabs 27 and 27' may be bent inwardly along the bend lines 26' and the edge wall flaps 28 and 28' may then be folded inwardly and secured in overlapping relationship upon the inwardly bent tabs 27 to provide a shallow rectangular container of the sort illustrated in Figure 7, a desired quantity of the absorbent material 13 being, of course, charged into the container prior to sealing the same.

In this connection, it is desirable not to completely fill the carton with the absorbent material. Preferably the carton should be charged with absorbent material 13 within three-fourths to seven-eighths of its capacity in order to minimize spillage after the disposable unit shall have been conditioned for use as hereinafter described, and also to afford space for receiving animal excreta therein during the service life of the disposable receiver.

The top wall 22 of the carton also may be formed to facilitate the formation of a central opening 29 therein to expose the contents of the carton for use in the manner contemplated in the commode device of the present invention. To this end, the top wall 22 of the carton may be formed with score lines 30, or otherwise perforated along said score lines, to define the edges of said opening 29 and one or more tabs 31 to facilitate the removal of a portion 32 of the top wall 22 defined within the score lines 30. In order to assure against the escape of the material from the carton through the perforations, or slits defining the score lines 30, it may be desirable to paste or otherwise secure a strip of material, such as gummed paper, on the scored top wall of the carton, in position covering the score lines. Alternately, the opening 29 may be formed in the top wall of the carton by removing the portion 32 during the formation of the blank 21', and a thin relatively tearable sheet of material 33, such as paper or cellophane, may be applied and sealed to the top wall 22 of the carton during the fabrication of the blank 21', in position covering the opening 29.

As a matter of merchandising expediency, and to facilitate sanitary disposition of the disposable receiver after it shall have concluded its service life, a rectangular open ended envelope 34, sized to snugly receive the carton 21, may be provided. Such envelope may comprise any suitable, preferably more or less impervious, sheet material, such as heavy paper, and may have an opening at a side or end thereof for the insertion and removal of the disposable receiver 12 into and from the envelope. The envelope, at its open end, may be provided with means, such as binding tabs 35, for allowing the open end of the envelope to be interfolded and securingly sealed in closed position by means of the tabs.

The carton 21 is sized to snugly and frictionally interfit within the dependent rib or bead 18 of the tray 11. Accordingly, upon removal from the envelope 34, the carton may be conditioned for service by tearing out the removable portion 32 along the score lines 30, or by tearing out the closure sheet 33. Thereupon, the tray 11 may be applied firmly upon the top of the carton with the floor opening 17 of the tray in registration with the opening 29 of the carton. After the disposable receiver 12 shall have become fouled in use to an extent making replacement desirable, the tray 11 may be removed from the carton 21, which may then be replaced in the envelope 34. The envelope may then be closed and sealed up to provide a sanitary package for disposal along with other garbage.

As shown in Figures 4, 5 and 6, an exceedingly simple and inexpensive tray structure 11 may be provided for use in conjunction with a disposable container of the sort shown in Figures 7-10, such arrangement employing the top wall 22 of the disposable receiver 12 as the floor of the tray. To this end, the corner portions of the top wall 22 of the carton may be slightly indented, as along lines of bend 36, so that the carton wall 22 will slope downwardly and inwardly from the marginal edges thereof toward the opening 29. The tray 11, as shown in Figures 4, 5 and 6, comprises a pair of spaced side wall members 15' and downwardly and mutually inwardly sloping end walls 16', the inner and lower ends of the end walls terminating substantially at the lower edges of the side walls and being formed with downwardly and inwardly facing edge notches 18', including downwardly facing notch surfaces adapted to overlie and rest upon the opposite ends of the top wall 22 of the carton. The notches 18' also provide oppositely facing shoulders adapted to snugly engage and frictionally receive the opposite end walls of the carton 21, thereby performing the carton gripping function of the dependent bead 18 in the embodiment shown in Figures 1-3. The lower edges of the spaced side walls 15' may also extend in position to snugly and frictionally receive the opposite side edges of the carton 21 therebetween, so that said lower edges of the side walls also aid in performing the receiver engaging and gripping function of the dependent bead 18 in the embodiment shown in Figures 1-3.

The tray 11, shown in Figures 4-6, like the tray illustrated in Figures 1-3, may be made of any suitable or preferred material including wood, sheet metal and plastic material. Where the tray is made of sheet metal, it is within the purview of the present invention to form the tray as an integral sheet metal stamping which may be enameled if desired. Where made of wood or other porous material, the tray may, and preferably should, be coated with moisture resistant varnish or paint.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An animal commode comprising a shallow rectangular container, granular absorbent material enclosed within said container, said container having a top wall formed with a central opening therein revealing the granular contents of the container.

2. An animal commode comprising a shallow rectangular container, granular absorbent material enclosed within said container, said container having a top wall formed with a central opening therein revealing the granular contents of the container, and means forming upstanding marginal side and end walls extending on said container upwardly of its said top wall.

3. A animal commode comprising a shallow rectangular carton, granular absorbent material enclosed within said carton, said carton having a top wall formed to provide a central opening therein revealing the granular contents of the carton, the upper wall of said carton comprising wall portions inclined downwardly and inwardly from the marginal edges thereof toward said central opening.

4. An animal commode comprising a shallow rectangular carton, granular absorbent material enclosed within said carton, said carton having a top wall formed to provide a central rectangular opening therein revealing the granular contents of the carton, and open bottom tray means removably mountable on said carton in open communication with the said central opening.

5. An animal commode comprising a shallow rectangular carton, granular absorbent material enclosed within said carton, said carton having a top wall formed to provide a central opening therein, a tray having a floor formed with a central opening, and means to mount the tray on the receptacle with said floor opening in registration with the central opening of the carton.

6. An animal commode comprising a shallow rectangular carton, granular absorbent material enclosed within said carton, said carton having a top wall formed with a central opening therein, and readily removable closure means normally closing said opening.

7. An animal commode comprising a shallow rectangular carton, granular absorbent material enclosed within said carton, said carton having a top wall formed with a central opening therein, and a sheet of readily tearable material closing said opening.

8. An animal commode comprising a shallow rectangular carton, granular absorbent material enclosed within said carton, said carton having a top wall formed to provide a central rectangular opening therein, said carton having a wall portion normally closing said opening and defined by score lines along which said wall portion may be torn from the carton to uncover said opening.

9. An animal commode comprising a shallow rectangular carton, granular absorbent material enclosed within said carton, said carton having a top wall formed with a normally closed central opening therein for receiving animal excreta therethrough into the carton, and a sealable envelope enclosing the carton for delivery to the user and in which the carton may be sealed for ultimate sanitary disposition after the conclusion of its service life.

10. An animal commode comprising, in combination, a rectangular receptacle, a rectangular tray removably mounted on the receptacle, said tray comprising opposed side walls having downwardly extending portions adapted to engage and frictionally receive the opposed side walls of the receptacle therebetween, and opposed end walls having dependent portions spaced to frictionally receive the opposite end walls of the receptacle therebetween, whereby to mount the tray on and in centered relationship with respect to the receptacle.

11. A commode for animals comprising a tray sized to receive therein the animal to be accommodated, said tray having a bottom formed with a centrally disposed opening of size sufficient to permit passage therethrough of animal excreta, including turds, said tray being adapted for removable attachment upon the top of a receptacle, in open communication therewith through said opening, said tray also providing upstanding spaced apart side walls and spaced apart end walls, said side walls extending at substantially higher elevation than said end walls, to induce entry of an animal onto the tray from either end thereof.

12. A commode for animals comprising a tray sized to receive therein the animal to be accommodated, said tray having a bottom formed with a centrally disposed opening of size sufficient to permit passage therethrough of animal excreta, including turds, said tray being adapted for removable attachment upon the top of a receptacle, in open communication therewith through said opening, said tray also providing upstanding spaced apart side walls and spaced apart end walls, said side walls extending at substantially higher elevation than said end walls, to facilitate entry of an animal onto the tray from either end thereof, the relatively higher side walls serving to retain the animal in centered position on the tray and with respect to the receiver on which it is mounted.

13. A commode for animals comprising a tray sized to receive therein the animal to be accommodated, said tray having a bottom formed with a centrally disposed opening of size sufficient to permit passage therethrough of animal excreta, including turds, said tray being adapted for removable attachment upon the top of a receptacle, in open communication therewith through said opening, said tray also providing upstanding spaced apart side walls and spaced apart end walls, said side walls extending at substantially higher elevation than said end walls, and granular absorbent material in said receptacle.

14. A commode for animals comprising a tray sized to receive therein the animal to be accommodated, said tray having a bottom formed with a centrally disposed opening of size sufficient to permit passage therethrough of animal excreta, including turds, said tray being adapted for removable attachment upon the top of a receptacle, in open communication therewith through said opening, the bottom of said tray sloping downwardly and inwardly from the peripheral edges thereof toward said centrally disposed opening, to thereby deliver animal excreta toward and through said opening.

15. A commode for animals comprising a tray sized to receive therein the animal to be accommodated, said tray providing upstanding spaced apart side walls and spaced apart end walls formed at the lower ends thereof for frictional engagement with a receptacle for the removable attachment of said tray in mounted position thereon, said side walls extending at substantially higher elevation than the end walls.

16. A commode for animals comprising a tray sized to receive therein the animal to be accommodated, said tray providing upstanding spaced apart side walls and spaced apart, downwardly and mutually inwardly inclined end walls formed for frictional engagement at the lower ends thereof with a receptacle to mount the tray thereon.

17. A commode for animals comprising a tray sized to receive therein the animal to be accommodated, said tray providing upstanding spaced apart side walls and spaced apart, downwardly and mutually inwardly inclined end walls formed for frictional engagement at the lower ends thereof with a receptacle to mount the tray thereon, said side walls extending at substantially higher elevation than said end walls to aid in retaining an animal in centered position on the tray and with respect to the receptacle on which it is mounted.

References Cited in the file of this patent
UNITED STATES PATENTS

| | | |
|---|---|---|
| 1,650,039 | Price | Nov. 22, 1927 |
| 1,693,435 | Clarke | Nov. 27, 1928 |
| 1,964,274 | Rodnon | June 26, 1934 |
| 2,053,594 | Albert | Sept. 8, 1936 |
| 2,091,664 | Walsh | Aug. 31, 1937 |
| 2,144,329 | Conlon et al. | Jan. 17, 1939 |
| 2,279,405 | Laughlin | Apr. 14, 1942 |
| 2,306,014 | Carson | Dec. 22, 1942 |
| 2,335,198 | Smith | Nov. 23, 1943 |
| 2,469,784 | Quinn | May 10, 1949 |
| 2,584,656 | Anderson | Feb. 5, 1952 |
| 2,626,096 | Hickin | Jan. 20, 1953 |